United States Patent
Yeh et al.

(10) Patent No.: US 7,821,326 B2
(45) Date of Patent: Oct. 26, 2010

(54) CHARGE PUMP

(75) Inventors: Cheng-Chung Yeh, Taipei (TW); Han-Chao Chen, Hsinchu (TW)

(73) Assignee: Sitronix Technology Corp., Jhupei (TW)

( * ) Notice: Subject to any disclaimer, the term of this patent is extended or adjusted under 35 U.S.C. 154(b) by 180 days.

(21) Appl. No.: 12/178,000

(22) Filed: Jul. 23, 2008

(65) Prior Publication Data

US 2009/0261891 A1    Oct. 22, 2009

(30) Foreign Application Priority Data

Apr. 17, 2008    (TW)  .............................. 97114008 A

(51) Int. Cl.
*G05F 1/10*    (2006.01)
*G05F 3/02*    (2006.01)

(52) U.S. Cl. ..................................... 327/536

(58) Field of Classification Search ................. 327/536; 363/59–60

See application file for complete search history.

(56) References Cited

U.S. PATENT DOCUMENTS

| | | | | |
|---|---|---|---|---|
| 5,589,697 | A * | 12/1996 | Smayling et al. | 257/204 |
| 6,501,325 | B1 * | 12/2002 | Meng | 327/536 |
| 6,535,052 | B2 * | 3/2003 | Myono | 327/536 |
| 7,030,683 | B2 * | 4/2006 | Pan et al. | 327/536 |
| 7,427,891 | B2 * | 9/2008 | Sakurai et al. | 327/536 |
| 7,466,189 | B2 * | 12/2008 | Sohara et al. | 327/536 |
| 2009/0039947 | A1 * | 2/2009 | Williams | 327/536 |

* cited by examiner

*Primary Examiner*—Quan Tra
(74) *Attorney, Agent, or Firm*—Ming Chow; Sinorica, LLC

(57) ABSTRACT

The present invention relates to a charge pump, which uses a chopper circuit or a clamp circuit coupled between a pump capacitor and an output capacitor for preventing a parasitic transistor produced by a switching mechanism from turning on. Thereby, the performance of the charge pump is improved effectively.

36 Claims, 14 Drawing Sheets

CHARGE PUMP

FIELD OF THE INVENTION

The present invention relates to a charge pump, and particularly to a charge pump capable of improving power efficiency, shortening the rise time or fall time of output voltage, and enhancing reliability in high temperatures.

BACKGROUND OF THE INVENTION

With advancements in modern technologies, people's lives become more convenient increasingly. No matter in work or in entertainment, people cannot avoid electronic products. Thereby, many electronic products are developed to bring convenience to people.

A charge pump based on switched capacitors is applied extensively in various electronic products due to its lower electromagnetic interference (EMI) and higher electromagnetic compatibility (EMC), especially for handheld electronic devices such as PDAs and cell phones. However, following the progress of handheld electronic products, different functions are integrated into a single chip (SOC, System-On-a-Chip) continually. Thereby, the voltage levels supplied to the internal of the chip diversify. The battery of a handheld device usually supplies a single voltage Vsup around 2.7V. Nevertheless, owing to demands from product functions, a charge pump is needed to convert the about ~2.7V voltage to various voltages, for example, a voltage doubler, which supplies 2*Vsup (around 4.5V~5.4V, depending on the load current), and a voltage inverter, which supplies −1*Vsup (around −2V~−2.7V, depending on the load current). Of course, it is also possible that a voltage multiplier with higher multiplication coexists. For example, in the driving circuit of a small-sized liquid crystal display, a seven- or eight-times voltage multiplier and a five- or six-times negative voltage multiplier are needed. In the fabrication process of integrated circuits, there exist many inherent and inevitable parasitic devices, such as parasitic diodes and parasitic bipolar junction transistors. If these parasitic devices conduct unexpectedly, the performance of the original circuits will be affected or even fail. In the charge pumps according to the prior art, such parasitic diodes exist in the MOS devices used as the switches for capacitors. In the following, the problems caused by the parasitic bipolar junction transistors will be described.

FIGS. 1A, 1B, and 1C show a circuit diagram, timing diagrams, and an integrated-circuit structural schematic diagram of the first and second switches of a doubler charge pump according to the prior art, respectively. As shown in the figures, the doubler charge pump comprises a first switch 10', a pump capacitor 11', a second switch 12', a third switch 13', a fourth switch 14', an output capacitor 15', a first buffer 20', a second buffer 21', a third buffer 22', and a fourth buffer 23'. The first switch 10' is coupled to the power supply VDD and a first terminal of the pump capacitor 11'. A second terminal of the pump capacitor 11' is coupled to the second and third switches 12', 13'. The second switch 12' is coupled between the power supply VDD and the second terminal 12'. The third switch 13' is coupled between the second terminal of the pump capacitor 11' and the ground. The fourth switch 14' is coupled to the first terminal of the pump capacitor 11' and one terminal of the output capacitor 15'. The output capacitor 15' is coupled between the fourth switch 14' and the ground. The buffers 20', 21', 22', 23' are coupled to the first, second, third, and fourth switches 10', 12', 13', 14', respectively, and receive a first, a second, a third, and a fourth input signals, respectively, for controlling the switches. The voltage of the doubler charge pump is about twice the power supply VDD, which is around 2.7V.

In FIG. 1B, the period (T1) can be divided into two parts including a charge-storing phase and a charge-transfer phase. When the charge pump is in the charge-storing phase, the first input signal is high, and the second, third, and fourth input signals are low. In this phase, the pump capacitor 11' stores charges, and the voltage across the pump capacitor 11' is VDD. When the charge pump is in the charge-transfer phase, the first input signal is low, and the second, third, and fourth input signals are high. In this phase, the pump capacitor 11' transfers charges to the output terminal AVDD.

Before the charge pump starts to operate, it is in the charge-storing phase. And the charge pump just starts, the clock of respective input signal starts to operate, that is, the first input signal changes from the high level to the low level to turn off the first switch 10', and the second, third, and fourth input signals change from the low level to the high level to turn on the second switch 12', to turn off the third switch 13', and to turn on the fourth switch 14', respectively. Thereby, the voltage level of the C1N terminal of the pump capacitor 11' changes from the low level (GND) to the high level (VDD). Because the voltage across the two terminals of the pump capacitor 11' will not change instantaneously, the voltage level of the C1P terminal of the pump capacitor 11' raises in transient from the high level (VDD) to double of the high level (2*VDD). At this time, in the normal (expected) circuit operation, owing to turning on of the fourth switch 14', the charges in the pump capacitor 11' will be divided to the output capacitor 15', and hence increasing the voltage level of the output terminal. However, there exists a parasitic PNP bipolar junction transistor 30'. The emitter voltage is the voltage (2*VDD) of the C1P terminal of the pump capacitor 11'. The base voltage is the voltage (VDD) of the output terminal. The collector voltage is the lowest voltage level in the chip, that is, GND. The voltage $V_{EB}$ across the emitter and the base of the parasitic bipolar junction transistor 30' is (2*VDD−VDD) =VDD=2.7V, greater than the threshold voltage (about 0.7V) of the bipolar junction transistor 30'. In addition, the voltage $V_{EC}$ across the emitter and the collector is 2*VDD>0. Thereby, the bipolar junction transistor 30' will be turned on in transient, and the charges originally stored in the pump capacitor 11' will be conducted to the ground. Consequently, the rise time of the output voltage when starting the charge pump will be prolonged. In a high-temperature environment, it can even lead to starting failure of the charge pump, and incurring a large current.

Besides, when the charge pump has finished starting and the output voltage is raised to a stable value (about 2*VDD), the output voltage will be supplied to another circuit, which is the load of the output voltage of the charge pump, and a voltage drop effect will occur in the output terminal (AVDD<2*VDD). When the load is sufficiently large to make AVDD<(2*VDD−$V_{EB(ON)}$), where $V_{EB(ON)}$ is the emitter-to-base voltage (around 0.7V) to turn on the parasitic bipolar junction transistor 30', the bipolar junction transistor 30' will be turned on periodically in the periodical transients of the charge pumping switching from the charge-storing phase to the charge-transfer phase, which makes the charges originally stored in the pump capacitor 11' be conducted to the ground and be wasted. Thereby, the power efficiency of the charge pump will be reduced. In the high-temperature environment, the phenomenon can even make the charge pump unable to supply sufficient output voltage, and a large current will be incurred.

Likewise, the problems described above also occur in an inverting charging pump (as shown in FIGS. 2A, 2B, and 2C), and will not be described in detail again.

Accordingly, the present invention provides a novel charge pump, which not only can prevent charge-pump performance deterioration due to turning on of the parasitic bipolar transistor produced during fabrication processes, but also can restore charges to the correct output terminal.

SUMMARY

An objective of the present invention is to provide a charge pump, which applies a chopper circuit or a clamp circuit for preventing the parasitic bipolar junction transistor in the charge pump from being turned on.

Another objective of the present invention is to provide a charge pump, which uses a chopper circuit or a clamp circuit for restoring charges to the correct output terminal.

The charge pump according to the present invention comprises a pump capacitor, a switch module, a first switch, a switching mechanism, an output capacitor, and a chopper circuit. The pump capacitor is used for producing a pump voltage. The switch module is coupled to a first terminal of the pump capacitor. The first switch is coupled to a second terminal of the pump capacitor. The switching mechanism is coupled to the first switch and the pump capacitor for switching the pump capacitor to output the pump voltage and producing a parasitic transistor. The output capacitor is coupled to the switching mechanism and the pump capacitor for outputting the pump voltage. The chopper circuit is coupled between the pump capacitor and the output capacitor for turning off the parasitic transistor.

In addition, the charge pump according to the present invention can further use a clamp circuit to replace the chopper circuit, where the clamp circuit or the chopper circuit is a Schottky diode, coupled between the pump capacitor and the output capacitor for preventing the parasitic transistor from turning on.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1A:
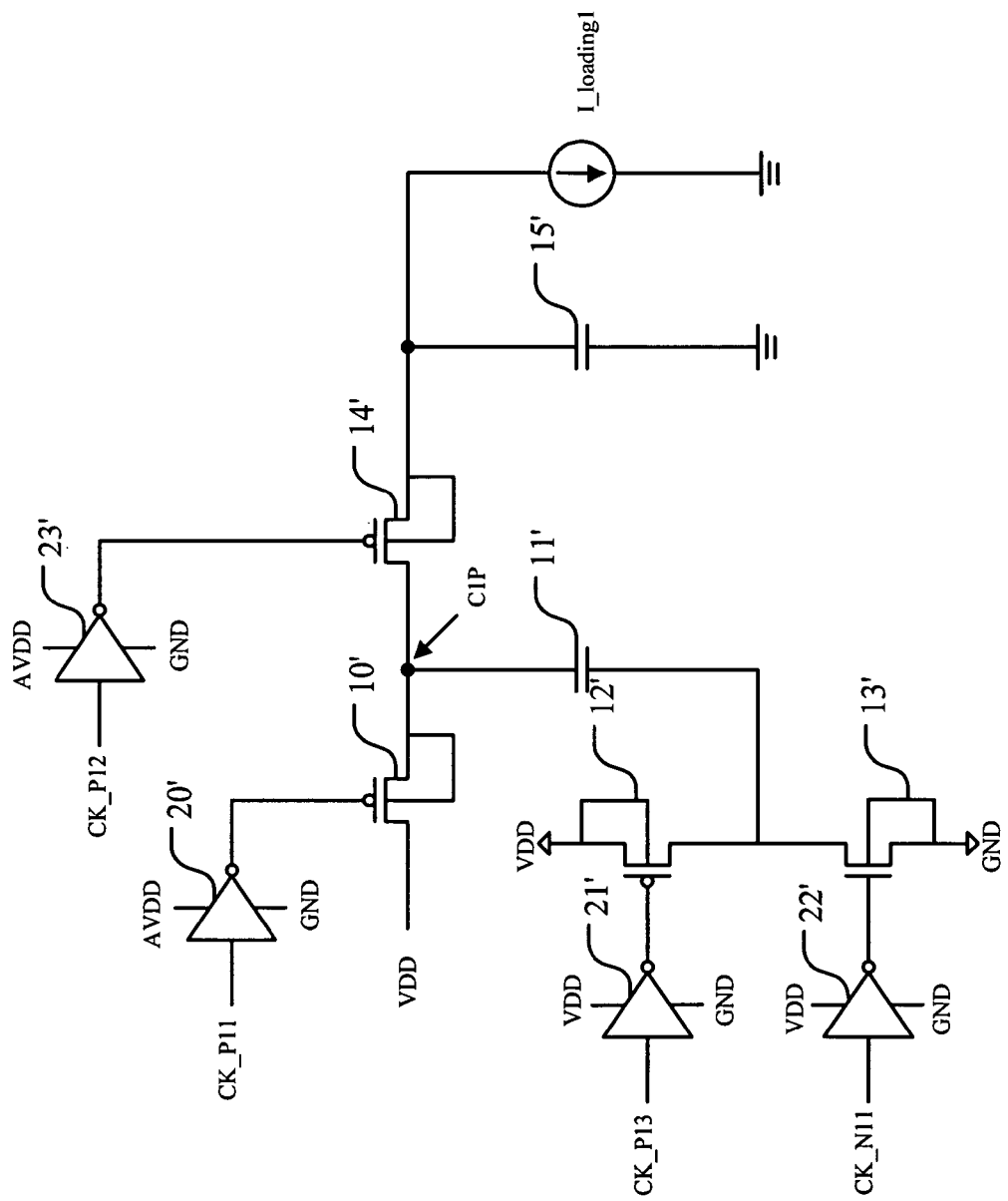
FIG. 1A shows a circuit diagram of a doubler charge pump according to the prior art.
Figure 1B:
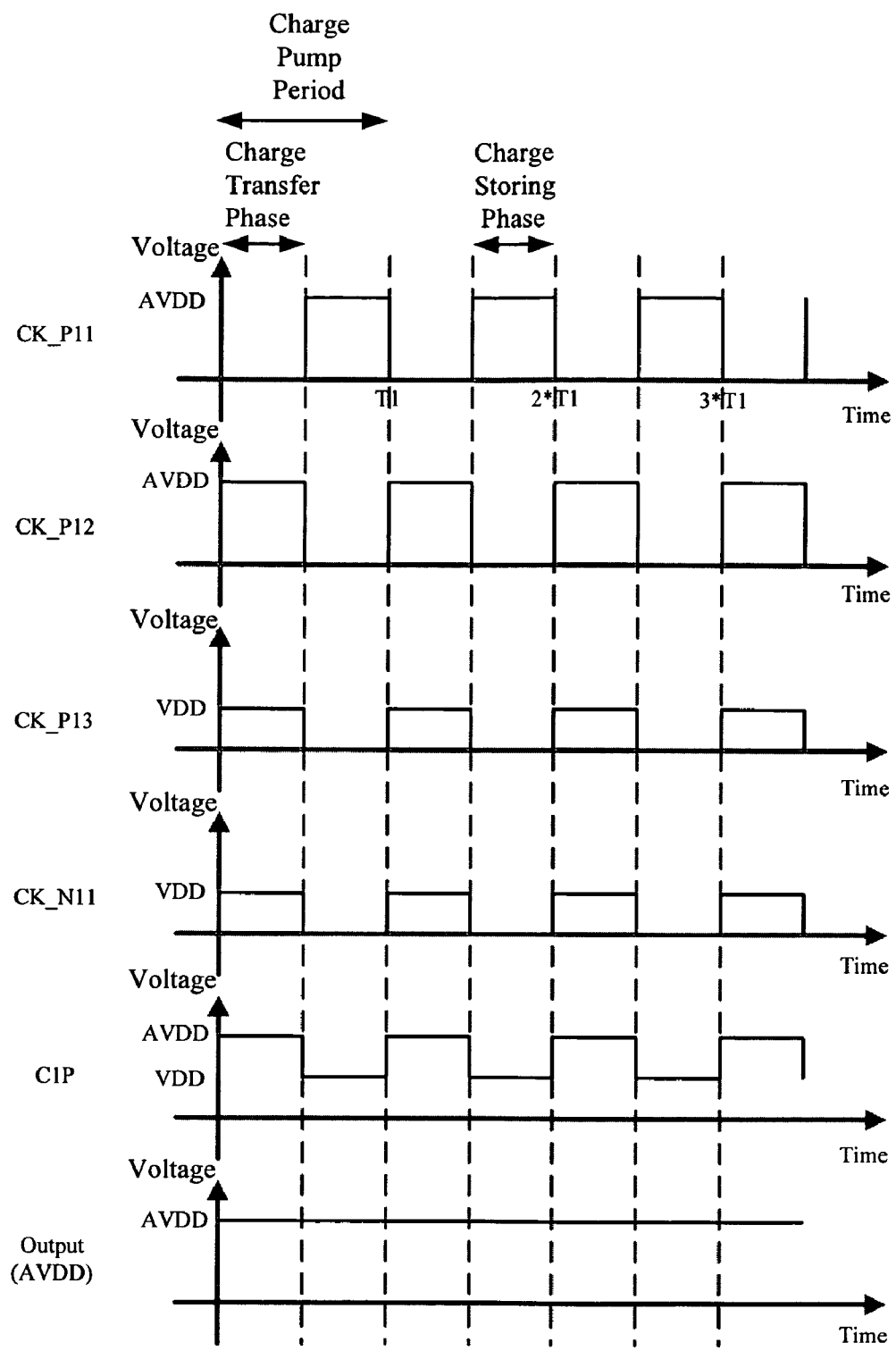
FIG. 1B shows timing diagrams output by a doubler charge pump according to the prior art.
Figure 1C:
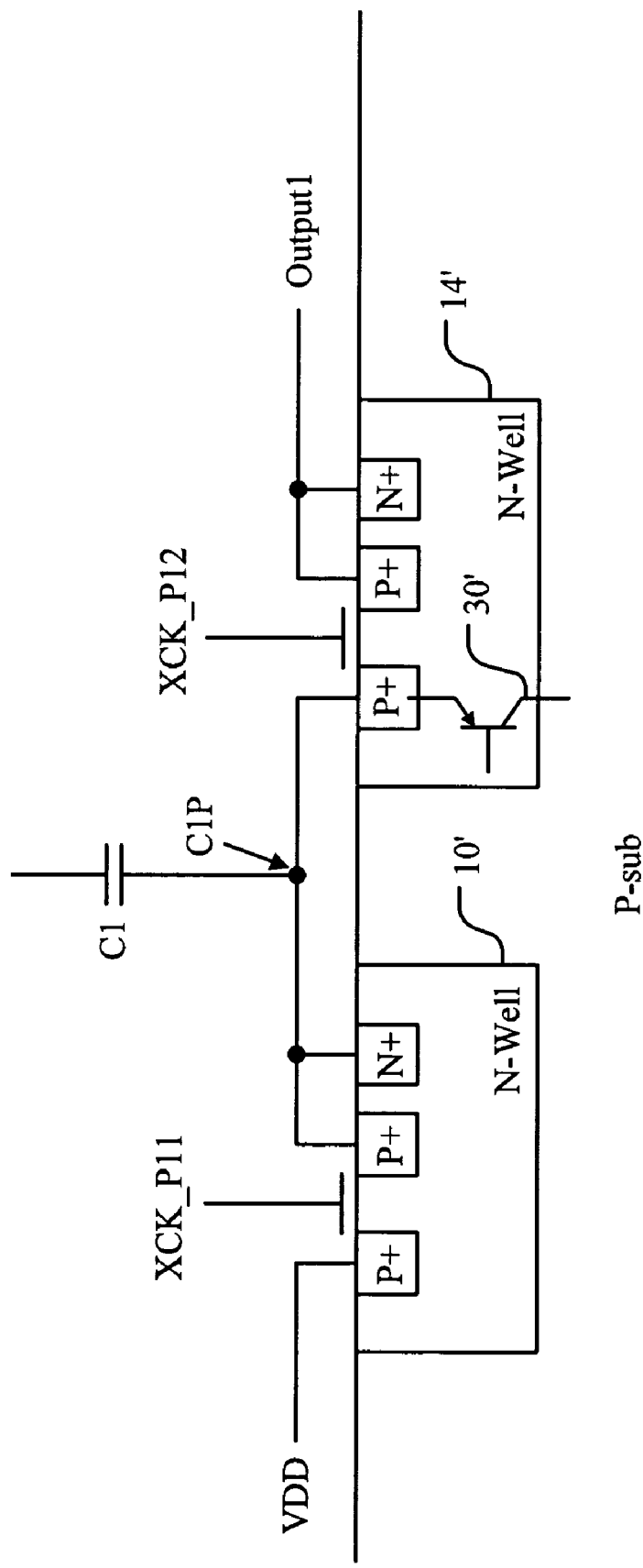
FIG. 1C shows an integrated-circuit structural schematic diagram of the first and second switches of a doubler charge pump according to the prior art.
Figure 2A:
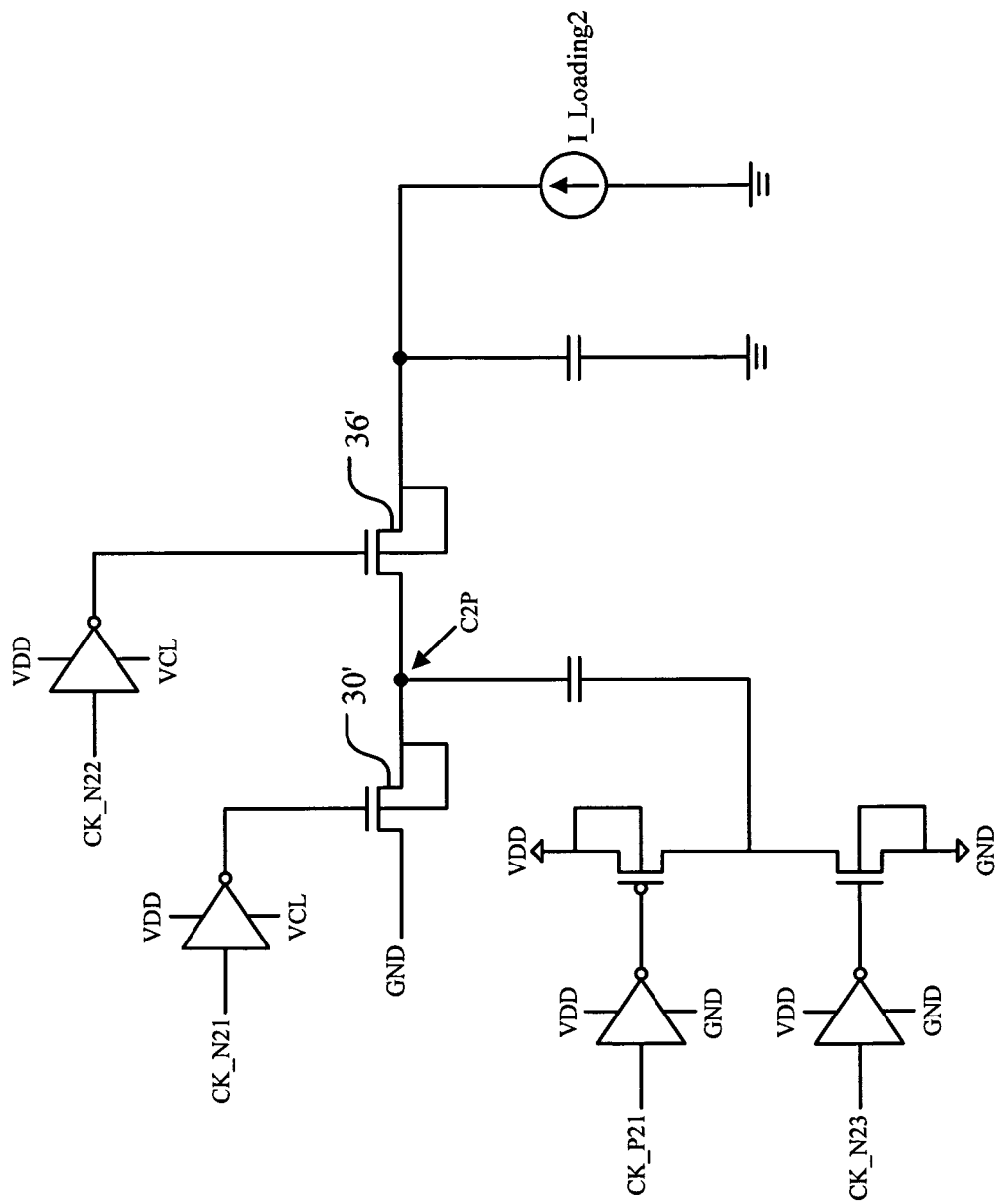
FIG. 2A shows a circuit diagram of an inverting charge pump according to the prior art.
Figure 2B:
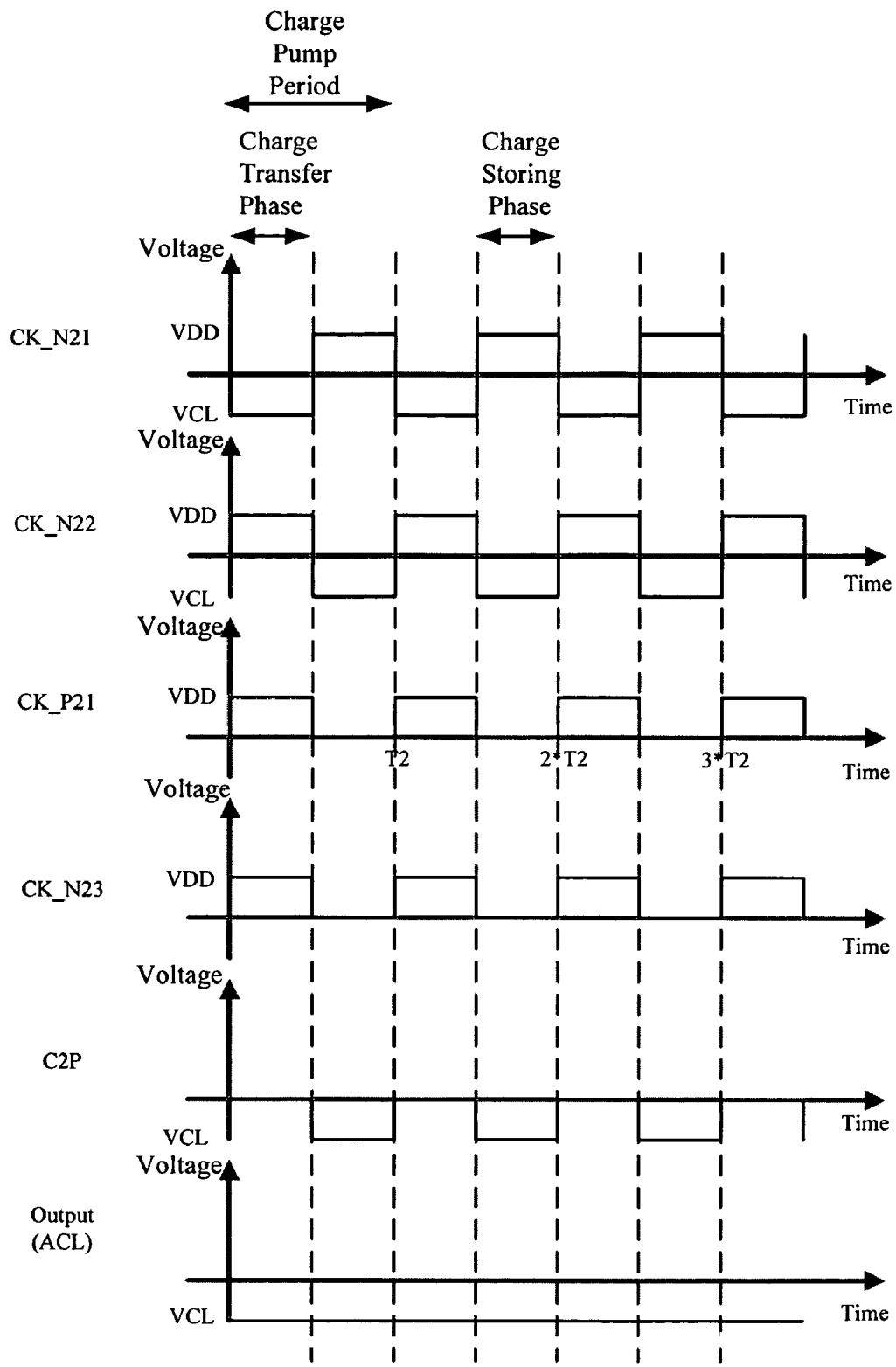
FIG. 2B shows timing diagrams output by an inverting charge pump according to the prior art.
Figure 2C:
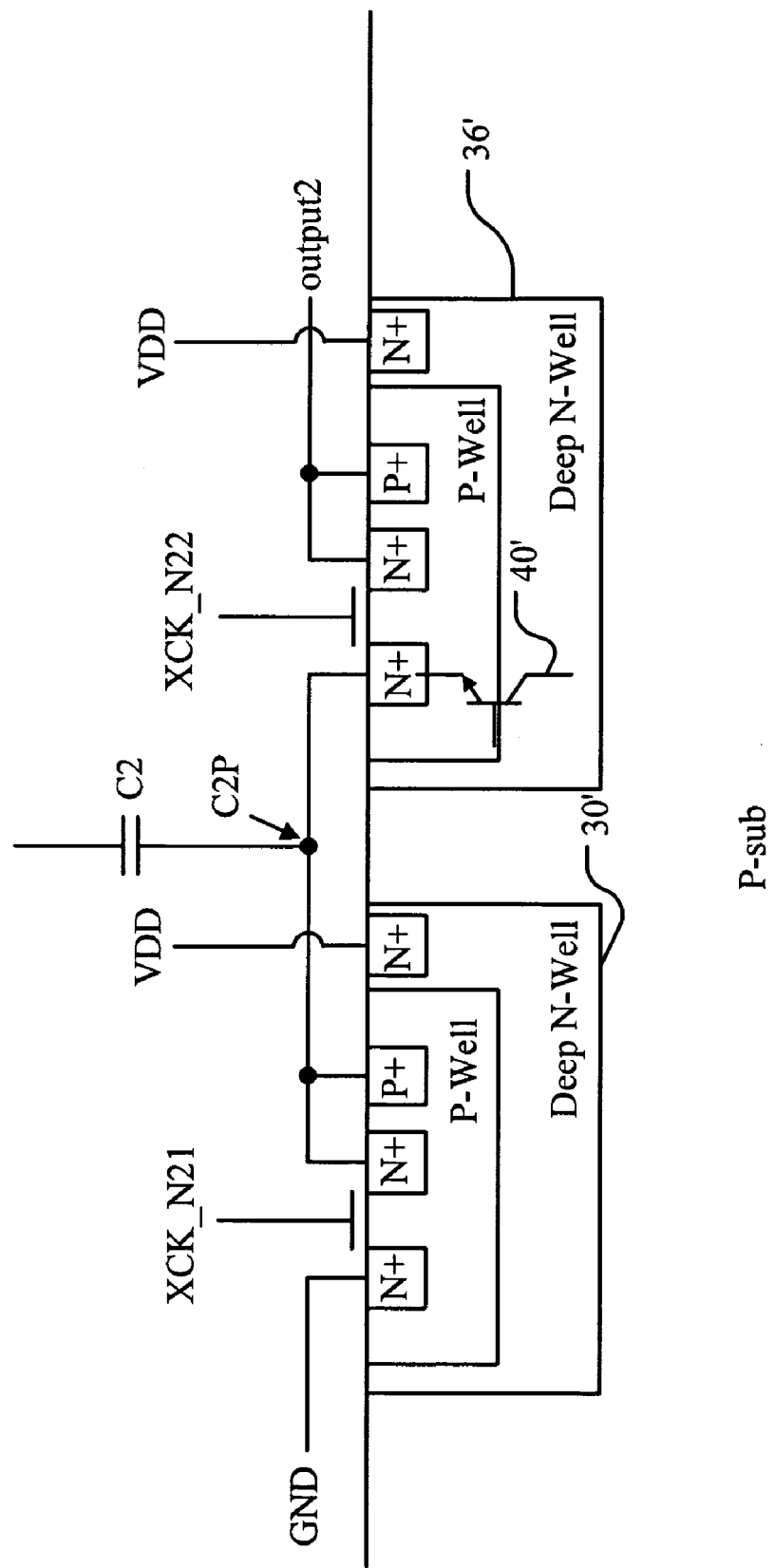
FIG. 2C shows a partial integrated-circuit structural schematic diagram of an inverting charge pump according to the prior art.
Figure 3A:
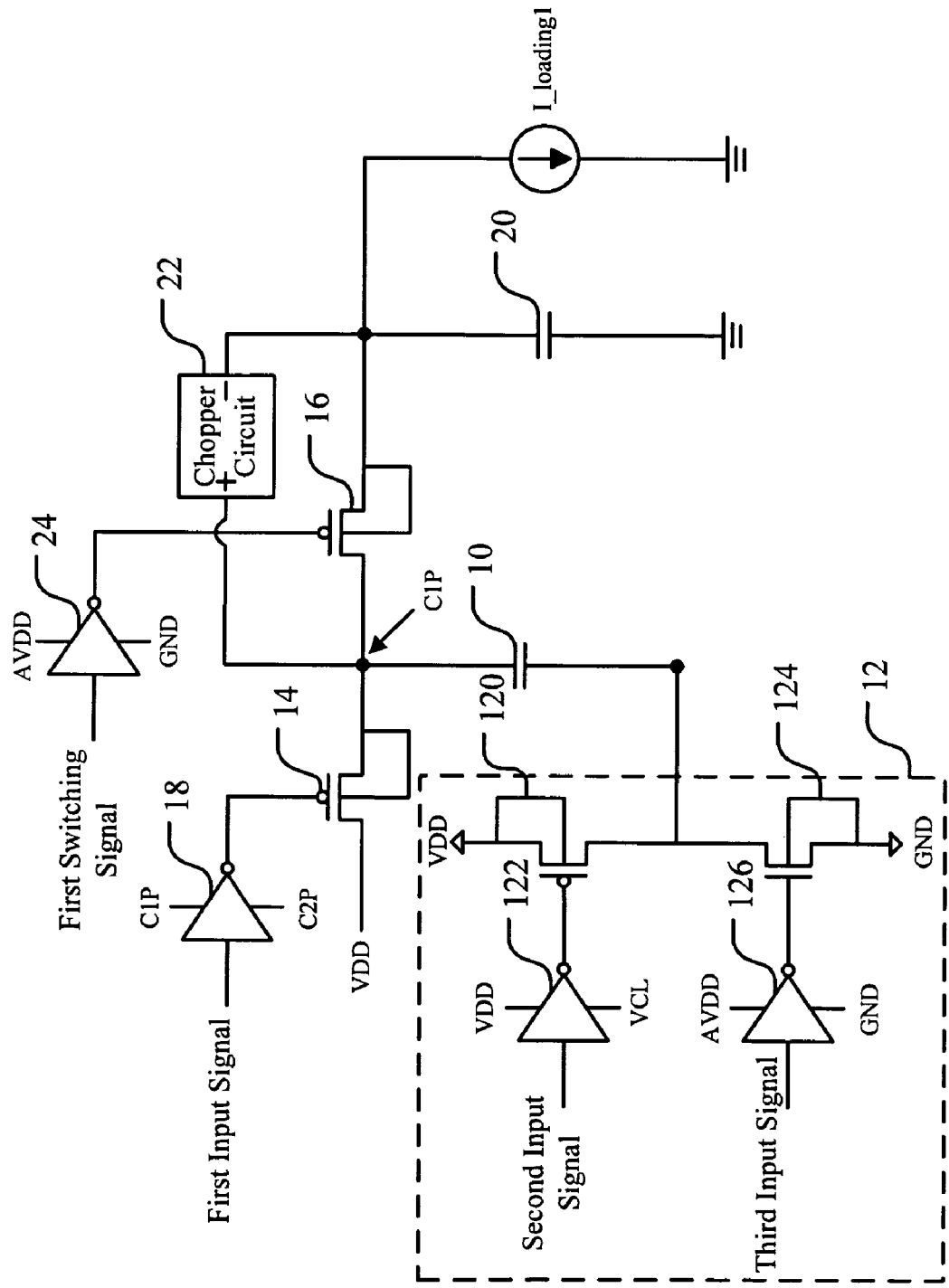
FIG. 3A shows a circuit diagram according to a preferred embodiment of the present invention.
Figure 3B:
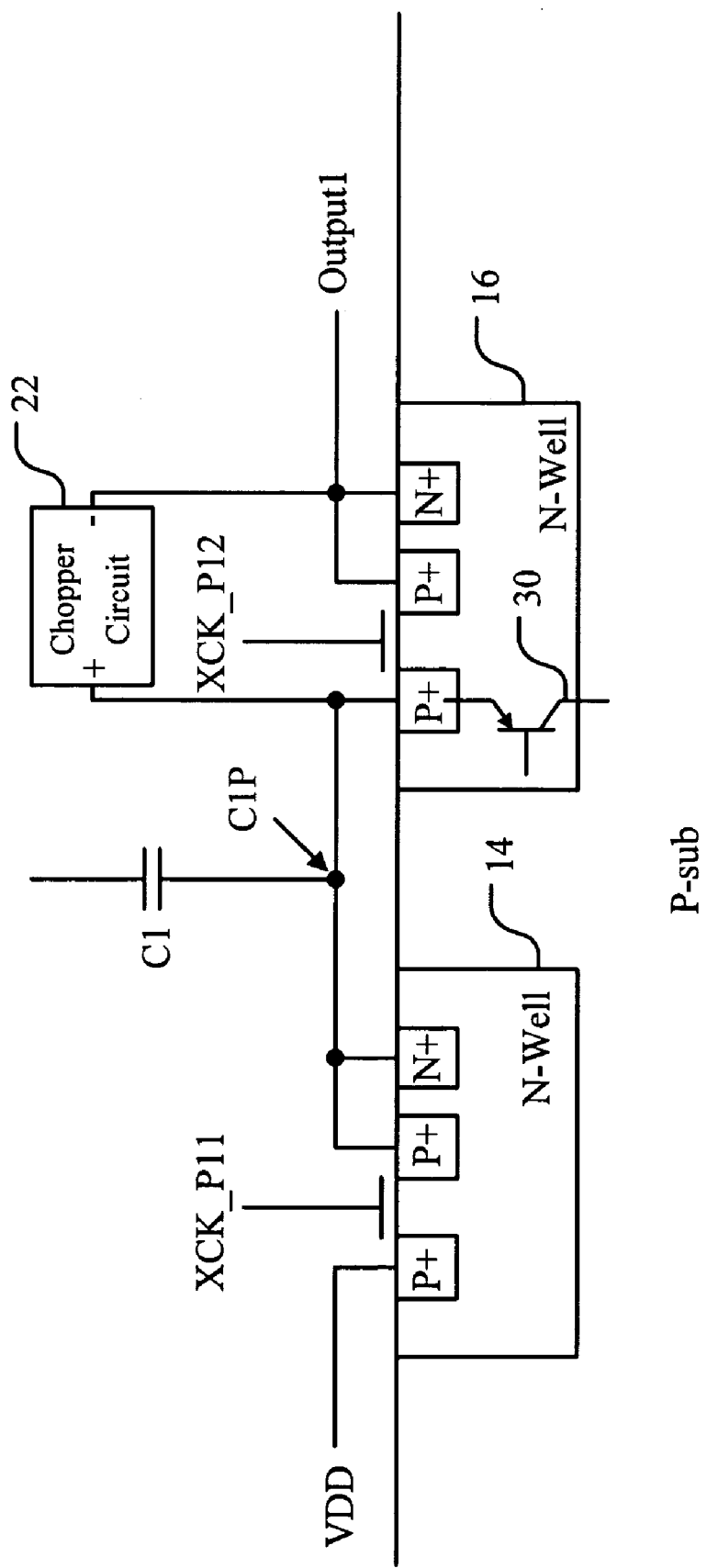
FIG. 3B shows an integrated-circuit diagram according to a preferred embodiment of the present invention.

FIGS. 3A and 3B show a circuit diagram and an integrated-circuit diagram, respectively, according to a preferred embodiment of the present invention. As shown in the figures, the charge pump according to the present invention is applied to a doubler charge pump. The charge pump comprises a first pump capacitor 10, a first switch module 12, a first switch 14, a first switching mechanism 16, a first output capacitor 20, and a first chopper circuit 22. The first pump capacitor 10 is used for producing a pump voltage. The first switch module 12 is couple to a first terminal of the first pump capacitor 10. The first switch 14 is coupled between a second terminal of the first pump capacitor 10 and the power supple (VDD). The first switching mechanism 16 is coupled to the first switch 14 and the first pump capacitor 10 for switching the first pump capacitor 10 to output the pump voltage, and produce a parasitic transistor 30. The first output capacitor 20 is coupled to the first switching mechanism 16 and the ground (GND). The chopper circuit 22 is coupled between the first pump capacitor 10 and the first output capacitor 20 to turn off the parasitic transistor 30 for preventing the rise time of the output voltage during charge-pump starting from prolongation. The turning on of the parasitic transistor 30 can also reduce the power efficiency of the charge pump. Beside, in a high-temperature environment, it can even lead to starting failure of the charge pump, and incurring a large current.

The charge pump according to the present invention further comprises a first buffer 18 and a driving buffer 24. The first buffer 18 is coupled to the first switch 14, and receives a first input signal to produce a control signal for turning on/off the first switch 14. The driving buffer 24 is coupled to the first switching mechanism 16, and receives a first switching signal to produce a driving signal for turning on/off the first switching mechanism 16. Thereby, when the charge pump is in the charge-transfer phase, the charges stored in the first pump capacitor 10 can be transmitted to the first output capacitor 20 for outputting voltage.

The first switching module 12 according to the present invention comprises a second switch 120, a second buffer 122, a third switch 124, and a third buffer 126. The second switch 120 is coupled to the power supple (VDD) and the first terminal of the pump capacitor 10. The second buffer 122 is coupled to the second switch 120, and receives a second input signal for turning on/off the second switch 120. The third switch 124 is coupled to the ground (GND) and the first terminal of the first pump capacitor 10. The third buffer 126 is coupled to the third switch 124, and receives a third input signal for turning on/off the third switch 124.

Before the charge pump starts to operate, it is in the charge-storing phase. When the charge pump just starts, the clocks of the first to the third input signals and the first switching signal start to operate. That is, the first input signal changes from the high level to the low level to turn off the first switch 14. The second input signal, the third input signal, and the first switching signal change from the low level to the high level to turn on the second switch 122 and the third switch 126, and to turn off the first switching mechanism 16, respectively. Thereby, the voltage of the first terminal of the first pump capacitor 10 changes from the low level (GND) to the high level (VDD). Because the voltage across the two terminals of the first pump capacitor 10 will not change instantaneously, the voltage level of the second terminal of the first pump capacitor 10 raises in transient from the high level (VDD) to double of the high level (2*VDD). At this time, owing to turning on of the first switch mechanism 16, the charges in the first pump capacitor 10 will be divided to the first output capacitor 20, and hence increasing the voltage level of the output terminal.

Because there exists a PNP parasitic transistor 30, which is bipolar junction transistor, in the integrated circuit of the first switching mechanism 16. The emitter voltage of the parasitic transistor 30 is the voltage (2*VDD) of the second terminal of the first pump capacitor 10. The base voltage is the voltage (VDD) of the output terminal. The collector voltage is the lowest voltage in the chip, that is, the ground (GND). The voltage across the emitter and base ($V_{EB}$) of the parasitic transistor 30 is (2*VDD−VDD)=VDD=2.7V, greater than the threshold voltage (about 0.7V) of a general bipolar junction transistor. Besides, the emitter-to-collector voltage ($V_{EC}$) is 2*VDD>0. Thereby, in order to prevent instantaneous turning on of the parasitic transistor 30 and leaking the charges stored in the first pump capacitor 10 to the ground (GND), when the charge pump operates, which is the transient when the charge pump changes from the charge-storing phase to the charge-transfer phase, the chopper circuit 22 can be coupled between the first pump capacitor 10 and the first output capacitor 20. The chopper circuit 22 conducts uni-directionally. The positive terminal of the chopper circuit 22 is coupled to the first pump capacitor 10, and the negative terminal thereof is coupled to the first output capacitor 20. Thereby, the positive terminal of the chopper circuit 22 is coupled to the emitter of the parasitic transistor 30, and the negative terminal thereof is coupled to the base of the parasitic transistor. Accordingly, in the transient when the chopper circuit 22 changes form the charge-storing phase to the charge-transfer phase, because the threshold voltage of the chopper circuit 22 is smaller than the threshold voltage (0.7V) of the parasitic transistor 30, the chopper circuit 22 will turn on earlier than the parasitic transistor 30. After turning on, the chopper circuit 22 will transfer the charges of the first pump capacitor 10 to the output terminal correctly with charge leakage problem. Hence, the power efficiency of the charge pump is improved, the rise time and fall time of the output voltage while starting is reduced, and the reliability of the circuit in a high-temperature environment is enhanced.

Figure 4:
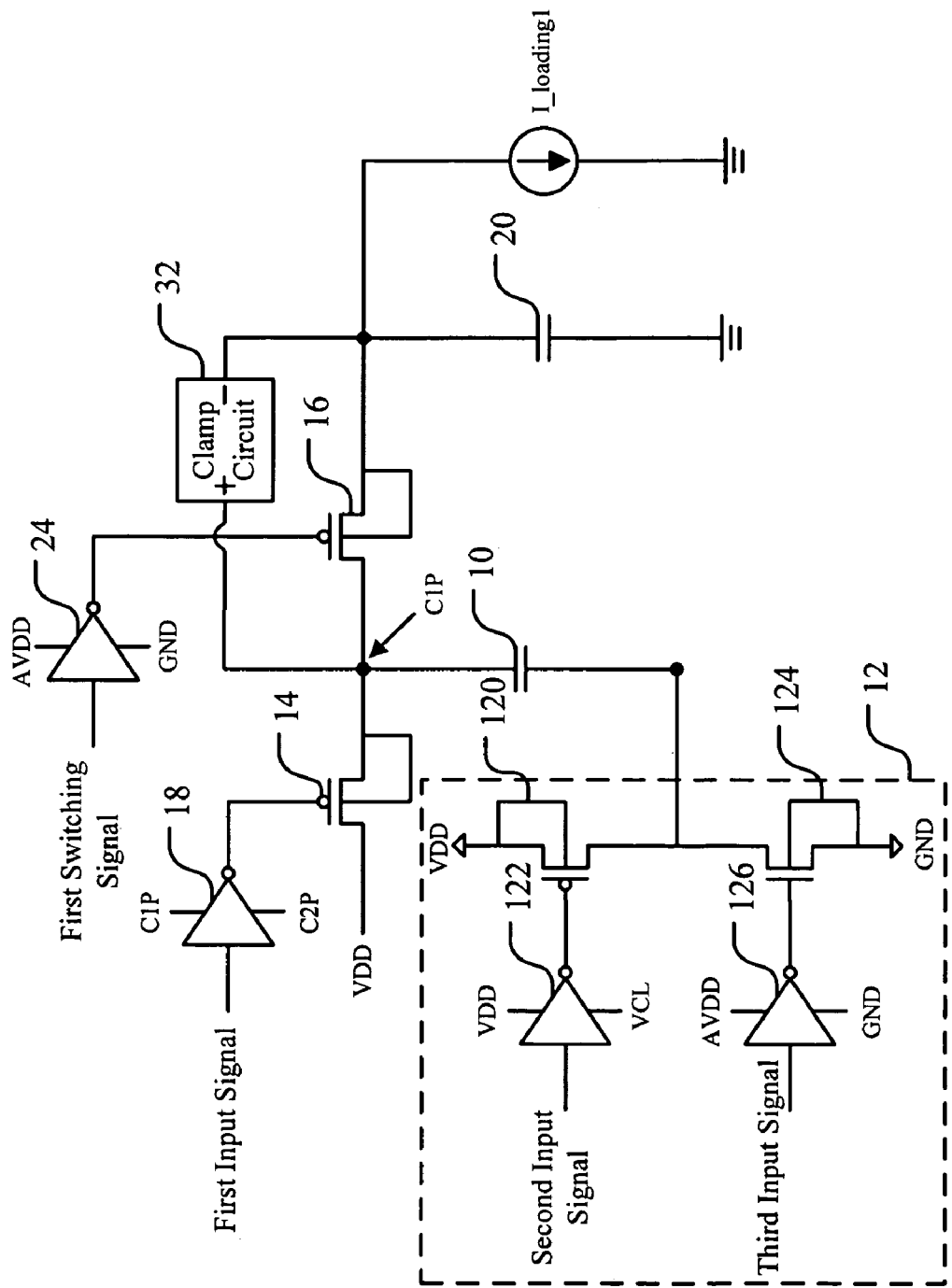
FIG. 4 shows a circuit diagram according to another preferred embodiment of the present invention.
Figure 5A:
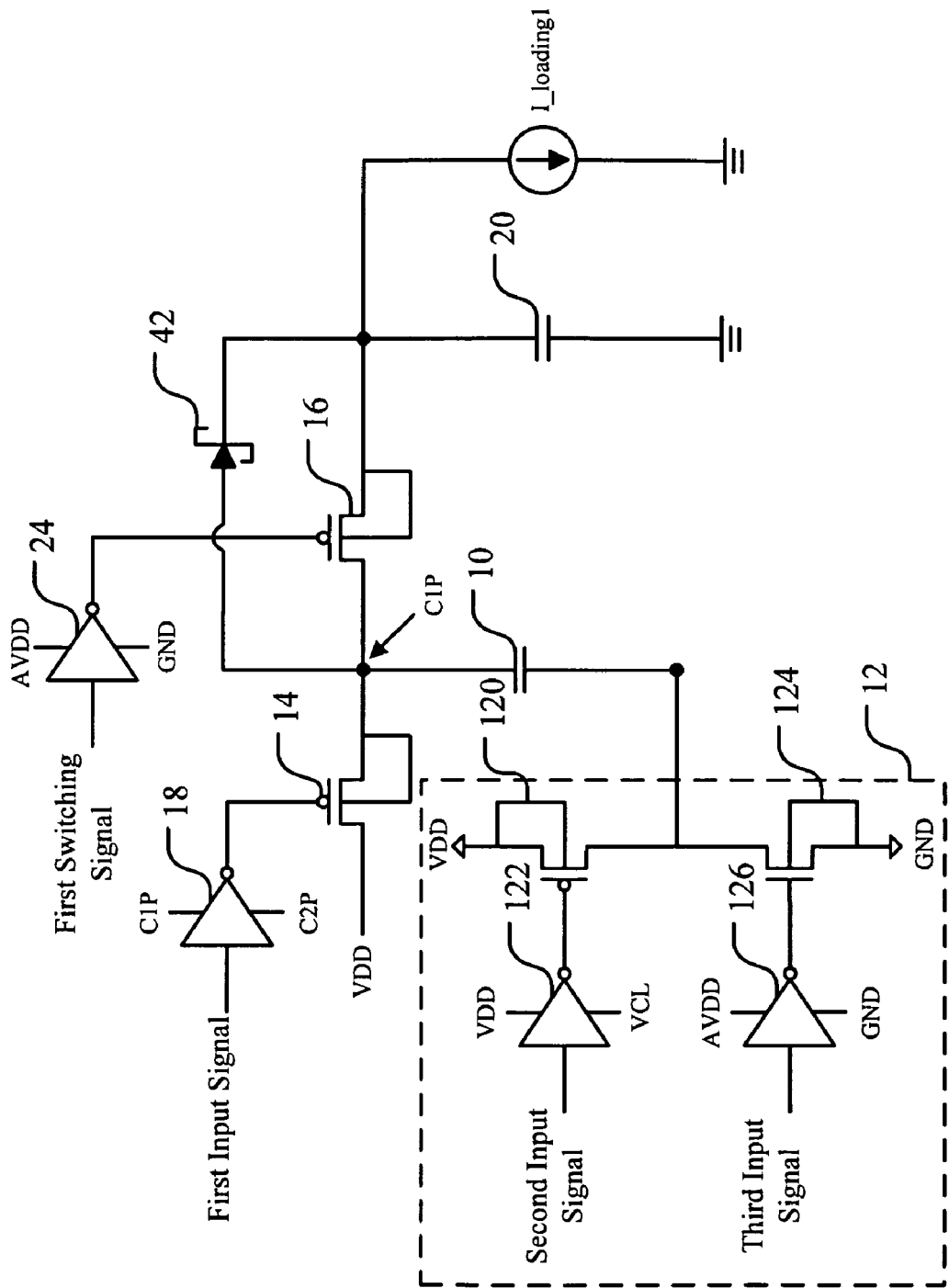
FIG. 5A shows a circuit diagram according to another preferred embodiment of the present invention.
Figure 5B:
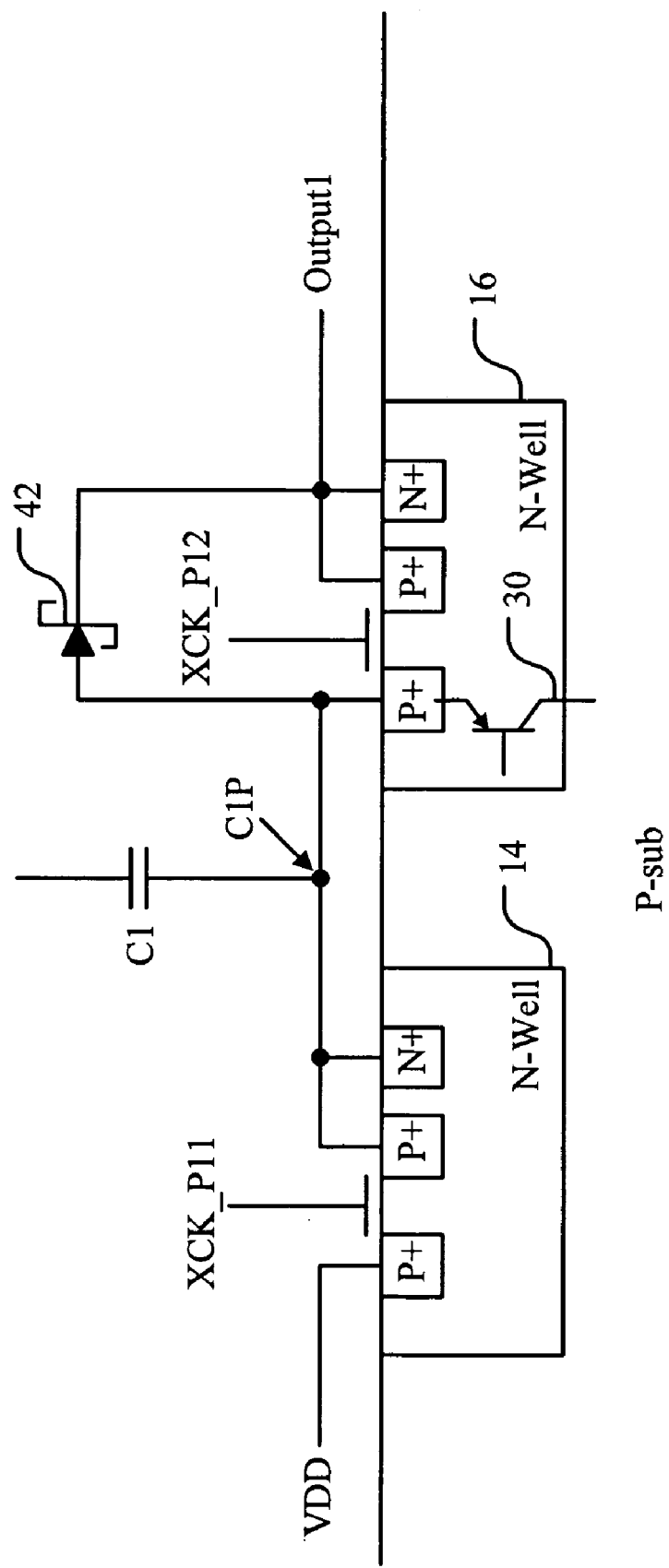
FIG. 5B shows an integrated-circuit diagram according to another preferred embodiment of the present invention.

Furthermore, the chopper circuit 22 can be replaced by a clamp circuit 32 (as shown in FIG. 4), and the chopper circuit 22 is a Schottky diode 42. As shown in FIGS. 5A and 5B, the anode of the Schottky diode 42 is coupled to the second terminal of the first pump capacitor 10, and the cathode thereof is coupled to the first output capacitor 20. Because the threshold voltage (about 0.2V~0.4V) of the Schottky diode is smaller than that of the bipolar junction transistor, the effect described above can be achieved.

In the description above, the first switch 10, the second switch 120, the third switch 126, and the first switching mechanism 16 are Metal-Oxide-Semiconductor Field-Effective Transistors (MOSFETs). In addition, the first buffer 18, the second buffer 122, the third buffer 124, and the driving buffer 24 are inverting buffers.

Figure 6A:
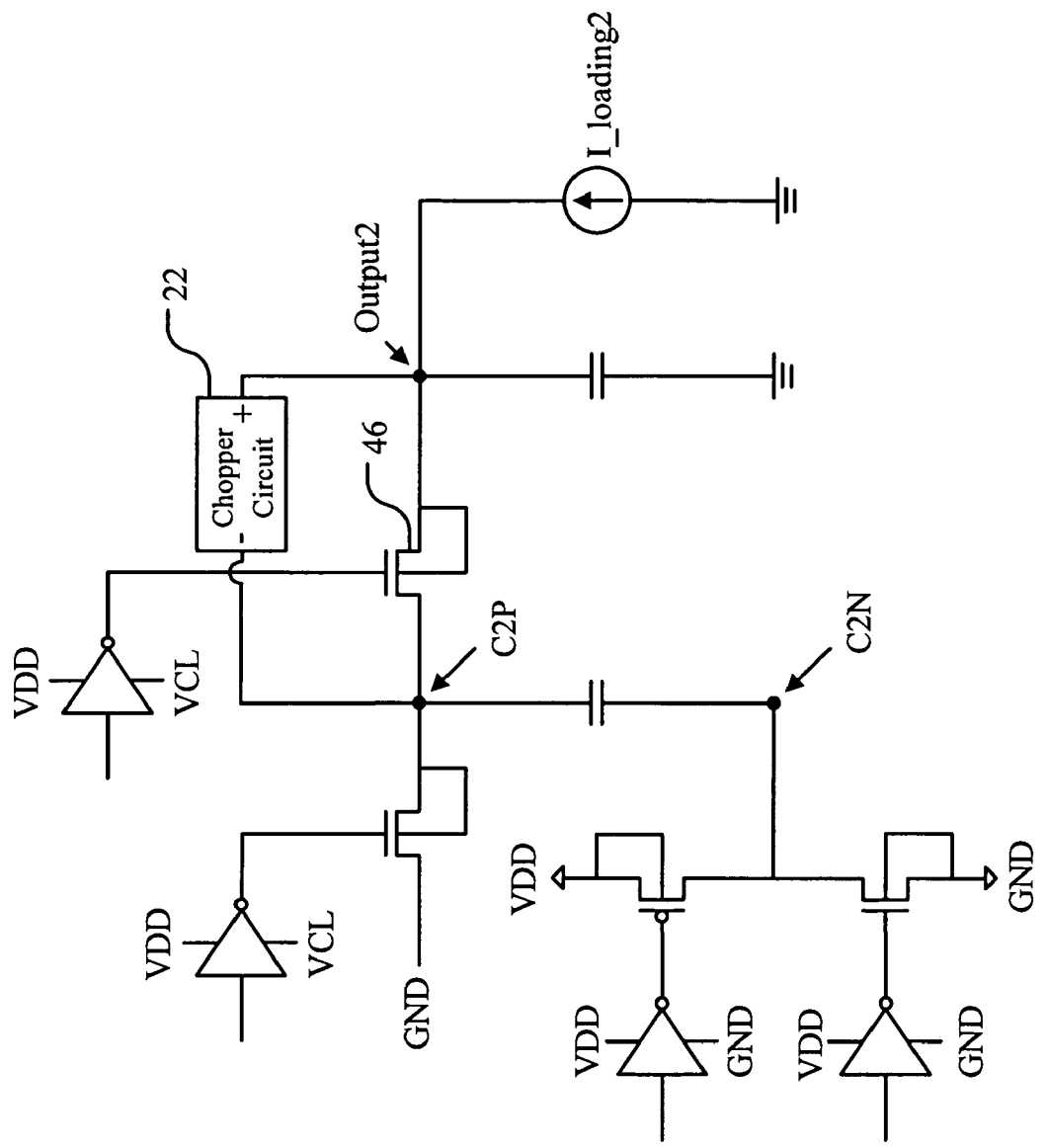
FIG. 6A shows a circuit diagram according to another preferred embodiment of the present invention.
Figure 6B:
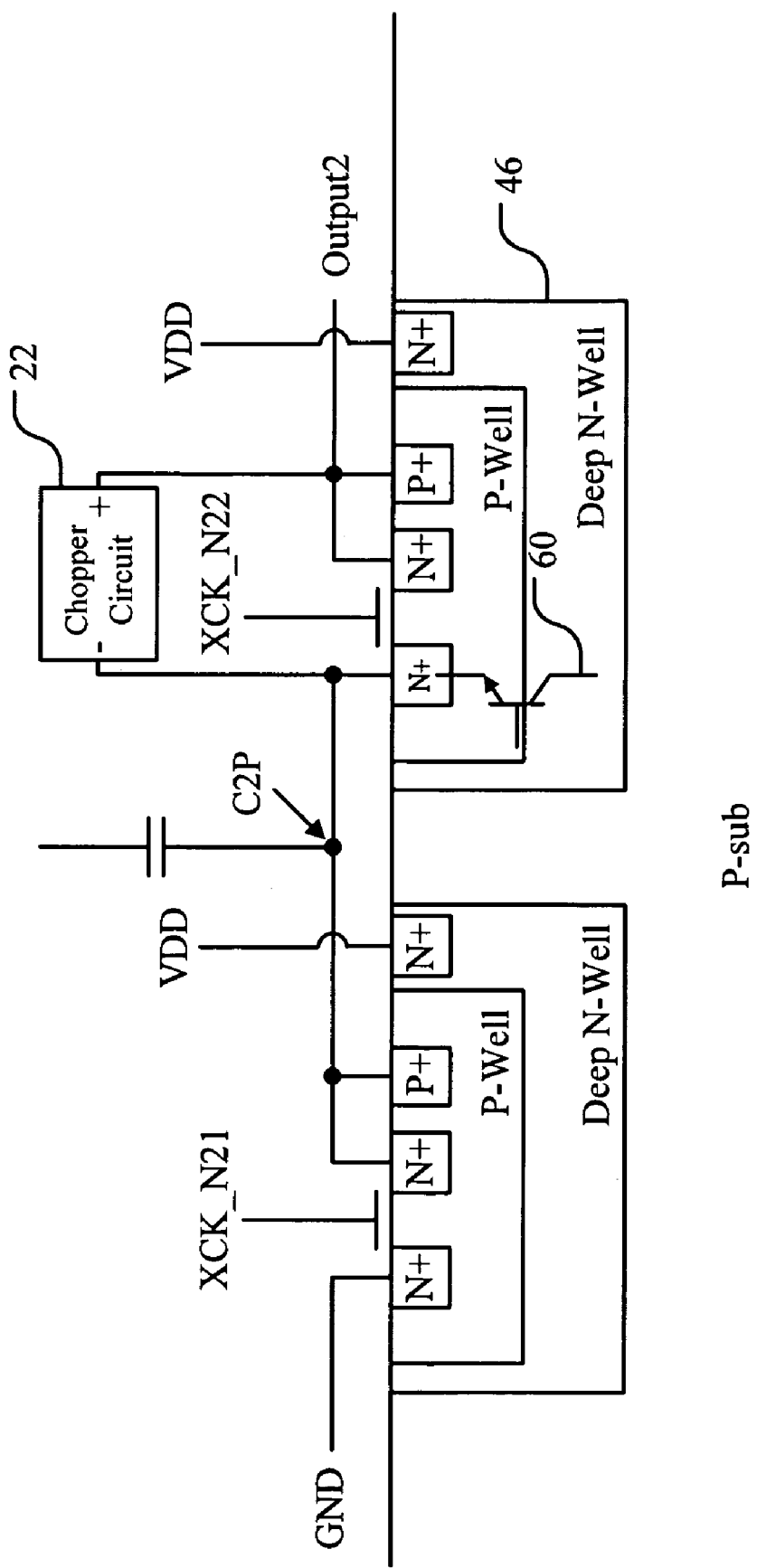
FIG. 6B shows an integrated-circuit diagram according to another preferred embodiment of the present invention.

FIGS. 6A and 6B are a circuit diagram and an integrated-circuit diagram according to another preferred embodiment of the present invention. As shown in the figure, the difference between FIGS. 6A, 6B and FIGS. 3A, 3B is that the charge pump according to the present preferred embodiment is applied to an inverting charge pump. In an inverting charge pump, the MOSFET of the first switching mechanism 16 is different from that of the second switching mechanism 46, that is, the first switching mechanism 16 is a PMOSFET and the second switching mechanism 46 is an NMOSFET. Thereby, the chopper circuit 22 is coupled reversely between the second pump capacitor 40 and the second output capacitor 50. Since the threshold voltage of the chopper circuit 22 is smaller than that of the parasitic transistor 60, the chopper circuit 22 can prevent the parasitic transistor 60 from turning on. Hence, the charge leakage problem can be avoided. Consequently, the power efficiency of the charge pump is improved, the rise time and fall time of the output voltage while starting is reduced, and the reliability of the circuit in a high-temperature environment is enhanced.

Figure 7:
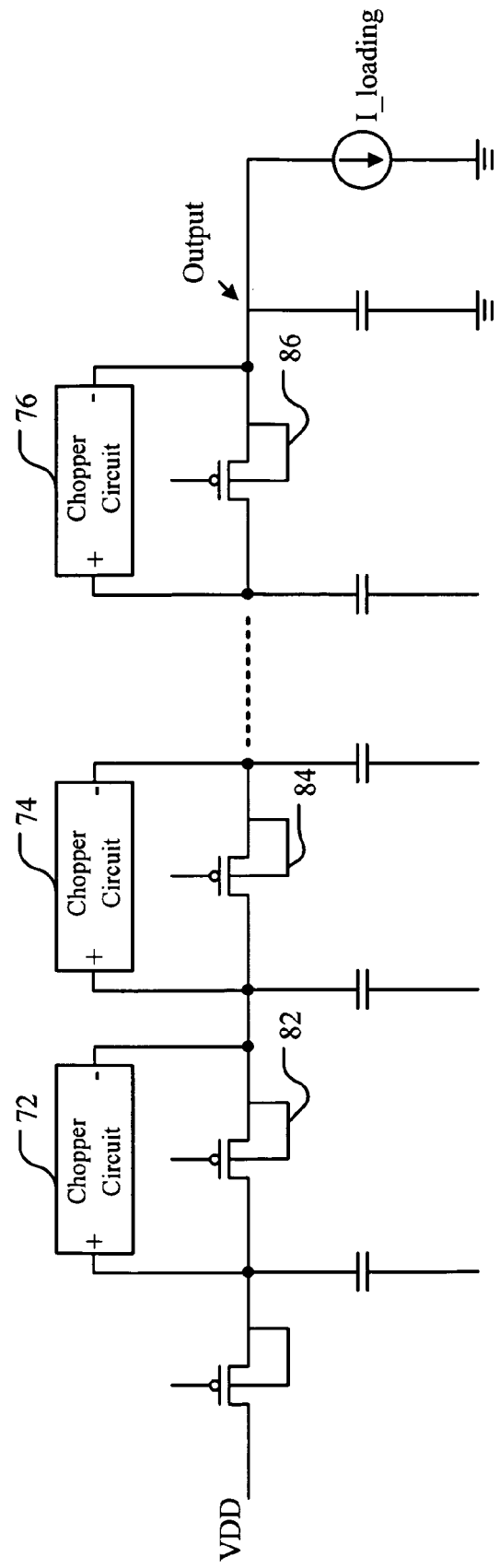
FIG. 7 shows a circuit diagram according to another preferred embodiment of the present invention.

Moreover, FIG. 7 shows a circuit diagram according to another preferred embodiment of the present invention. As shown in the figure, when the present invention is applied to a positive N-times charge pump, a plurality of chopper circuits 72, 74, 76 is coupled to a plurality of switching mechanisms 82, 84, 86, respectively, for preventing the parasitic transistors in the plurality of switching mechanisms 82, 84, 86 from turning on. Thereby, the power efficiency of the charge pump is improved, the rise time and fall time of the output voltage while starting is reduced, and the reliability of the circuit in a high-temperature environment is enhanced.

To sum up, the charge pump according to the present invention comprises a pump capacitor, a switch module, a first switch, a switching mechanism, an output capacitor, and a chopper circuit. The pump capacitor is used for producing a pump voltage. The switch module and the first switch are coupled to both terminals of the pump capacitor. The switching mechanism is coupled to the first switch and the pump capacitor for switching the pump capacitor to output the pump voltage. The output capacitor is coupled to the switching mechanism and the pump capacitor for outputting the pump voltage of the pump capacitor. The chopper circuit is coupled between the pump capacitor and the output capacitor for preventing a parasitic transistor of the switching mechanism from turning on, and the charge leakage problem can be avoided. Thereby, the power efficiency of the charge pump is improved, the rise time and fall time of the output voltage while starting is reduced, and the reliability of the circuit in a high-temperature environment is enhanced.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A charge pump, comprising:
 a pump capacitor, producing a pump voltage;
 a switch module, coupled to a first terminal of the pump capacitor;
 a first switch, coupled to a second terminal of the pump capacitor;
 a switching mechanism, coupled to the first switch and the pump capacitor, and switching the pump capacitor to output the pump voltage;
 an output capacitor, coupled to the switching mechanism and the pump capacitor for outputting the pump voltage;

a chopper circuit, coupled between the pump capacitor and the output capacitor; and wherein the switching mechanism includes a parasitic transistor, and a threshold voltage of the chopper circuit is smaller than a threshold voltage of the parasitic transistor.

2. The charge pump of claim 1, wherein the chopper circuit conducts uni-directionally.

3. The charge pump of claim 1, wherein the first switch is further coupled between the second terminal of the pump capacitor and the power supply.

4. The charge pump of claim 3, wherein the chopper circuit is a Schottky diode, an anode of the Schottky diode is coupled to the output capacitor, and a cathode of the Schottky diode is coupled to the pump capacitor.

5. The charge pump of claim 1, wherein the first switch is further coupled between the second terminal of the pump capacitor and the ground.

6. The charge pump of claim 5, wherein the chopper circuit is a Schottky diode, an anode of the Schottky diode is coupled to the pump capacitor, and a cathode of the Schottky diode is coupled to the output capacitor.

7. The charge pump of claim 1, further comprising a buffer, receiving an input signal and producing a control signal for controlling the first switch to be turned on or off.

8. The charge pump of claim 7, wherein the buffer is an inverting buffer.

9. The charge pump of claim 1, wherein the first switch is a Metal-Oxide-Semiconductor Field-Effective Transistor (MOSFET).

10. The charge pump of claim 1, wherein the switching mechanism is a MOSFET.

11. The charge pump of claim 1, wherein the switch module comprises:

a second switch, coupled to the power supply and the first terminal of the pump capacitor; and a second buffer, coupled to the second switch, and receiving an input signal for controlling the second switch to be turned on or off.

12. The charge pump of claim 11, wherein the second switch is a MOSFET.

13. The charge pump of claim 11, wherein the buffer is an inverting buffer.

14. The charge pump of claim 1, wherein the switch module comprises:

a third switch, coupled to the ground and the first terminal of the pump capacitor; and a third buffer, coupled to the third switch, and receiving an input signal for controlling the third switch to be turned on or off.

15. The charge pump of claim 14, wherein the third switch is a MOSFET.

16. The charge pump of claim 14, wherein the buffer is an inverting buffer.

17. The charge pump of claim 1, and further comprising a driving buffer, coupled to the switching mechanism, receiving a switching signal, and producing a driving signal for controlling the switching mechanism to be turned on or off.

18. The charge pump of claim 17, wherein the buffer is an inverting buffer.

19. A charge pump, comprising:

a pump capacitor, producing a pump voltage;

a switch module, coupled to a first terminal of the pump capacitor;

a first switch, coupled to a second terminal of the pump capacitor;

a switching mechanism, coupled to the first switch and the pump capacitor, and switching the pump capacitor to output the pump voltage;

an output capacitor, coupled to the switching mechanism and the pump capacitor for outputting the pump voltage;

a clamp circuit, coupled between the pump capacitor and the output capacitor; and wherein the switching mechanism includes a parasitic transistor, and a threshold voltage of the clamp circuit is smaller than a threshold voltage of the parasitic transistor.

20. The charge pump of claim 19, wherein the clamp circuit conducts uni-directionally.

21. The charge pump of claim 19, wherein the first switch is further coupled between the second terminal of the pump capacitor and the power supply.

22. The charge pump of claim 21, wherein the clamp circuit is a Schottky diode, an anode of the Schottky diode is coupled to the output capacitor, and a cathode of the Schottky diode is coupled to the pump capacitor.

23. The charge pump of claim 19, wherein the first switch is further coupled between the second terminal of the pump capacitor and the ground.

24. The charge pump of claim 23, wherein the clamp circuit is a Schottky diode, an anode of the Schottky diode is coupled to the pump capacitor, and a cathode of the Schottky diode is coupled to the output capacitor.

25. The charge pump of claim 19, and further comprising a buffer, receiving an input signal and producing a control signal for controlling the first switch to be turned on or off.

26. The charge pump of claim 25, wherein the buffer is an inverting buffer.

27. The charge pump of claim 19, wherein the first switch is a Metal-Oxide-Semiconductor Field-Effective Transistor (MOSFET).

28. The charge pump of claim 19, wherein the switching mechanism is a MOSFET.

29. The charge pump of claim 19, wherein the switch module further comprises:

a second switch, coupled to the power supply and the first terminal of the pump capacitor; and a buffer, coupled to the second switch, and receiving an input signal for controlling the second switch to be turned on or off.

30. The charge pump of claim 29, wherein the second switch is a MOSFET.

31. The charge pump of claim 29, wherein the buffer is an inverting buffer.

32. The charge pump of claim 19, wherein the switching mechanism further comprises:

a third switch, coupled to the ground and the first terminal of the pump capacitor; and a buffer, coupled to the third switch, and receiving an input signal for controlling the third switch to be tuned on or off.

33. The charge pump of claim 32, wherein the third switch is a MOSFET.

34. The charge pump of claim 32, wherein the buffer is an inverting buffer.

35. The charge pump of claim 19, and further comprising a driving buffer, coupled to the switching mechanism, receiving a switching signal, and producing a driving signal for controlling the switching mechanism to be turned on or off.

36. The charge pump of claim 33, wherein the buffer is an inverting buffer.

* * * * *